United States Patent [19]

Flandrois et al.

[11] Patent Number: 5,554,462
[45] Date of Patent: Sep. 10, 1996

[54] CARBON ANODE FOR A LITHIUM RECHARGEABLE ELECTROCHEMICAL CELL AND A PROCESS FOR ITS PRODUCTION

[75] Inventors: Serge Flandrois, Pessac; Annie Fevrier, St. Medard en Jalles; Philippe Biensan, Epinay S/Orge; Bernard Simon, Issy Les Moulineaux, all of France

[73] Assignee: Saft, Romainville, France

[21] Appl. No.: 360,953

[22] Filed: Dec. 21, 1994

[30] Foreign Application Priority Data

Dec. 22, 1993 [FR] France ................................. 93 15474
Jul. 5, 1994 [FR] France ................................. 94 08291

[51] Int. Cl.⁶ ..................................................... H01M 4/02
[52] U.S. Cl. ........................... 429/218; 429/194; 429/223; 429/224; 423/445 R
[58] Field of Search ..................................... 429/217, 218, 429/224, 194, 223, 194; 423/445

[56] References Cited

U.S. PATENT DOCUMENTS

| 4,749,514 | 1/1987 | Murakami et al. | 252/500 |
| 4,945,014 | 7/1990 | Miyabayashi et al. | 429/218 |
| 4,980,250 | 12/1990 | Takahashi et al. | 429/194 |
| 5,288,438 | 2/1994 | Zaldivar et al. | 264/29.6 |
| 5,415,957 | 5/1995 | Okada et al. | 429/194 |

FOREIGN PATENT DOCUMENTS

| 0239410A3 | 9/1987 | European Pat. Off. |
| 0267791 | 5/1988 | European Pat. Off. |
| 0573266A1 | 12/1993 | European Pat. Off. |

OTHER PUBLICATIONS

*Patent Abstracts of Japan*, vol. 12, No. 337 (E-657) 12 Sep. 1988 & JP-A-63 102 166 (Mitsubishi Gas Chem Co Inc) 7 May 1988.
*Chemical Abstracts*, vol. 80, No. 8, 25 Feb. 1974, Columbus, OH, US; Abstract No. 39091g, Inagaki M. et al, "Structural Change of Graphite with Grinding", No. 74, 1973, pp. 76–82.
*Electrochimica Acta*, vol. 38, No. 9, Jun. 1993, Oxford GB, pp. 1179, 1191, J. R. Cahn et al, "Dependence of the Electrochemical Interclaation of Lithium in Carbons on the Crystal Structure of the Carbon".
*Patent Abstracts of Japan*, vol. 17, No. 81 (E-1321) 18 Feb. 1993 & JP-A-04 280 068 (Takamii Norio) 6 Oct. 1992.
*Carbon*, vol. 5, 1967, GC pp. 441–451, H. Gasparous, "Modification Des Proprietes Magnitiques Du Graphite Par Creation de Sequences Rhomboedriques".
*Patent Abstracts of Japan*, vol. 7, No. 62 (E-164) 15 Mar. 1983 & JP-A-57 208 079 (Sanyo Denki KK) 21 Dec. 1982.

*Primary Examiner*—M. Nuzzolillo
*Attorney, Agent, or Firm*—Sughrue, Mion, Zinn, Macpeak & Seas

[57] ABSTRACT

The present invention concerns a carbon anode for a lithium rechargeable electrochemical cell, comprising a graphite-containing carbon-containing material which includes, prior to electrical cycling, at least a first phase constituted by graphite having a rhombohedral crystal structure and comprising a fraction of more than 10%.

9 Claims, 7 Drawing Sheets

CARBON ANODE FOR A LITHIUM RECHARGEABLE ELECTROCHEMICAL CELL AND A PROCESS FOR ITS PRODUCTION

The present invention relates to a carbon anode for a lithium rechargeable electrochemical cell and to a process for its production. It also extends to a cell containing the anode.

BACKGROUND OF THE INVENTION

The use of a carbon-containing material suitable for lithium insertion to make the anode of lithium rechargeable electrochemical cells is becoming widespread, to the detriment of lithium metal anodes. The cycling ability of the cell is considerably improved, as is safety in use. Nevertheless, such carbon-containing materials lead to large losses of cell capacity during the initial cycles. Part of the initial capacity of the cathode is irreversibly lost in forming a passivation layer on the carbon in the anode due to reduction of the electrolyte. This loss increases with increasing size of the material to be passivated. Nevertheless, the instability at low potential of the electrolytes used makes the presence of this passivation layer essential.

Early work carried out in this field related to carbon-containing coke type materials that were crystallized to a greater or lesser extent. Nowadays, most work relates to electrodes based on natural or artificial graphites such as the lithium insertion material. Coke that is partially in the form of graphite or mixed with graphite has been mentioned on several occasions, as have spherical carbons and modified carbons. The physico-chemical modifications described relate generally to surface properties, to the addition of atoms other than carbon in the core of the material, or to the extent to which the carbon is graphitized by heat treatment. Such carbons have not made it possible significantly to reduce the losses of capacity due to the formation of the passivation layer.

Proposals have also been made to compensate for said losses by including a reserve of lithium at the anode end. The lithium may be in the form of a metal sheet stuck to the anode as in patent WO-90/13924, or it may be in the form of lithium inserted within the anode chemically or electrochemically. The first solution has the drawback of mechanically loosening the electrochemical couple because of the lithium that is consumed and that becomes inserted in the carbon by short circuiting, thereby leaving a void. The second solution requires an additional step in the manufacture of the anode. That step is difficult to implement, in particular because of the hazards associated with some of the substances used, and subsequently the resulting anode must be handled using the same precautions as are required for handling lithium metal (no water, . . . ).

Finally, an additional capacity for compensating such losses can be inserted into the cathode in the form of lithium ions by means of an additional step during manufacture of the electrode, which step is expensive and difficult to implement. The resulting product is unstable in the presence of air and of water, and is therefore difficult to handle.

BRIEF DESCRIPTION OF THE INVENTION

An object of the present invention is to provide a carbon anode for a lithium rechargeable cell in which the losses of capacity at the beginning of cell lifetime are considerably smaller than those observed with known carbon-containing materials suitable for lithium insertion.

The present invention provides a carbon anode for a lithium rechargeable electrochemical cell that also includes a cathode and an electrolyte, the anode comprising a graphite-containing carbon-containing material, characterized in that said material includes, prior to electrical cycling, at least a first phase constituted by graphite having a rhombohedral crystal structure and comprising a fraction of more than 10%.

The said material preferably includes said first phase at a fraction that is greater than 14%.

Electrochemical evaluation of a lithium rechargeable cell including an anode of the present invention has shown that the losses of capacity during the first cycle are considerably reduced, for equivalent area, compared with an anode based on a carbon that does not contain rhombohedral structure graphite. For an advantageous effect to be observable, it is desirable for the fraction of said rhombohedral phase to be greater than 10% of the carbon-containing material. For given area, the initial loss of capacity is smaller, the greater the content of rhombohedral phase.

The relative fraction of the rhombohedral crystal phase contained in the anode of the invention is given by the ratio of the [101] X-ray diffraction line characteristic of the rhombohedral phase to the sum of the areas of the [101] lines of the phases present in the material. For greater accuracy, the area of the [101] X-ray diffraction line of the rhombohedral phase may be multiplied by the correction factor 15/12. This concentration can be expressed equally well in terms of atomic fraction, molar fraction or mass fraction since the same element is involved throughout.

In a variant, the anode comprises a carbon-containing material that also includes a second phase constituted by graphite having a hexagonal crystal structure. In this case, the rhombohedral phase fraction is given by:

$$\% = \frac{\text{rhombohedral } [101] \times 15/12}{(\text{rhombohedral } [101] \times 15/12) + [101] \text{ hexagonal}} \times 100$$

The material of the invention also has the advantage of being capable of being used with electrolytes containing certain solvents such as dimethoxyethane (DME) or propylene carbonate (PC) in which graphite exfoliation is particularly high. Graphites containing a high fraction of rhombohedral structure phase have the advantage of being very resistant to exfoliation. This phenomenon partially destroys the graphites and restricts their use as an electrode material.

The present invention also concerns a process for the production of a carbon-containing graphite-containing material including at least one phase constituted by a rhombohedral crystal structure graphite in a fraction of more than 10%, characterized in that it comprises the following steps:

introducing graphite into a liquid which is chemically inert to said graphite;

generating ultrasound waves in said liquid by vibrating an element which is in contact with said liquid;

separating said carbon-containing graphite-containing material from the liquid, then drying.

The ultrasound waves are normally generated by an element immersed in a liquid which element is known as a "sonotrode". It can be solid or hollow and be of various shapes; it is generally metallic. This element may also be constituted by the tank containing the liquid.

Ultrasound waves are inaudible to the human ear, i.e., have a frequency beyond about 16 kHz. Propagation in liquid medium causes the formation of bubbles, or cavitation. The characteristics of the cavitation effect obtained depend on the operating parameters of the process.

The wave frequency must not be too high or the cavitation effect does not have time to be produced. Most commercial apparatus supply a frequency of between 20 and 50 kHz. These commercial apparatus can generate the frequencies in continuous or in pulsed mode. These two modes of generating ultrasound waves can be used in the process of the invention and provide very similar results under the same application conditions.

Advantageously, a high viscosity liquid is used: this requires more power to generate cavitation, but the resulting effect is greater. Preferably, the liquid is selected from acetonitrile, water and an aqueous mixture containing a compound selected from an alcohol, for example ethanol, a ketone, for example acetone, and a salt, for example potassium iodide.

The process of the present invention has the advantage of being easy to carry out and is even simpler when the liquid selected is easy to separate from the powder. The treatment is rapid and a negligible quantity of material is lost.

In a preferred embodiment, the amplitude of the vibration is greater than 80 μm, the temperature is between the freezing point of the liquid and 20° C., and the period is at least 10 minutes.

Increasing the amplitude of the vibration of the element, and thus of the generated wave, increases the cavitation effect. This is limited in practice by the power of the apparatus used.

Reducing the temperature increases the viscosity of the liquid. Cavitation is harder to generate at low temperatures but the effects are greater. The temperature must, of course, be higher than the freezing point of the liquid used (0° C. for aqueous mixtures) to allow the ultrasound waves to propagate.

The period of application of the ultrasound waves depends on the kinetics of the intended reaction. Beyond a certain threshold, increasing the treatment period does not further increase the fraction of rhombohedral phase.

The anode of the invention also includes a binder selected from fluorine-containing polymers such as polyvinylidene fluoride (PVDF) or polytetrafluorethylene (PTFE) and copolymers thereof, fluorine-containing elastomers, e.g. such as the substance known under the trade name "Viton" of Du Pont de Nemours, ethylenepropylene diene terpolymer with a methylene main chain (EPDM), carboxymethylcellulose (CMC), copolymers of styrene and butadiene (SBS), and mixtures thereof.

In a first embodiment, the anode is constituted by a mixture of said carbon-containing graphite-containing material obtained by the process of the invention and a polymeric binder such as PVDF or one of its copolymers, deposited on a metal current collector.

In a second embodiment, the anode is constituted by a mixture of said carbon-containing graphite-containing material obtained by the process of the invention with acetylene black (AB) and a polymeric binder such as PTFE deposited on a metal current collector.

The resulting anode is stable in air and in the presence of water and is easy to make. The present invention still further relates to a lithium rechargeable electrochemical cell using the anode of the present invention further comprising a cathode and an electrode.

Preferably, the cathode includes a transition metal oxide selected from vanadium oxide, lithium-containing manganese oxides, oxides of nickel, cobalt, iron, titanium, and mixtures thereof.

The electrolyte is constituted by an organic solvent comprising a mixture of esters and/or ethers, such as dimethoxyethane (DME). The esters are selected from propylene carbonate (PC), ethylene carbonate (EC), butylene carbonate (BC), diethyl carbonate (DEC), dimethyl carbonate (DMC), and mixtures thereof. The solvent has dissolved therein a lithium salt selected from lithium perchlorate $LiClO_4$, lithium hexafluoroarsenate $LiAsF_6$, lithium hexafluorophosphate $LiPF_6$, lithium tetrafluoroborate $LiBF_4$, lithium trifluoromethanesulfonate $LiCF_3SO_3$, lithium trifuloromethanesulfonimide $LiN(CF_3SO_2)_2$ (LiTFSI)$^-$, or lithium trifluoromethanesulfonemethide $LiC(CF_3SO_2)_3$ (LiTFSM).

BRIEF DESCRIPTION OF THE DRAWINGS

Other characteristics and advantages of the invention will become apparent from the following description of the anode of the invention and from the following examples of implementations that are, of course, given by way of non-limiting illustration, and also from the accompanying drawings, in which.

Figure 11:
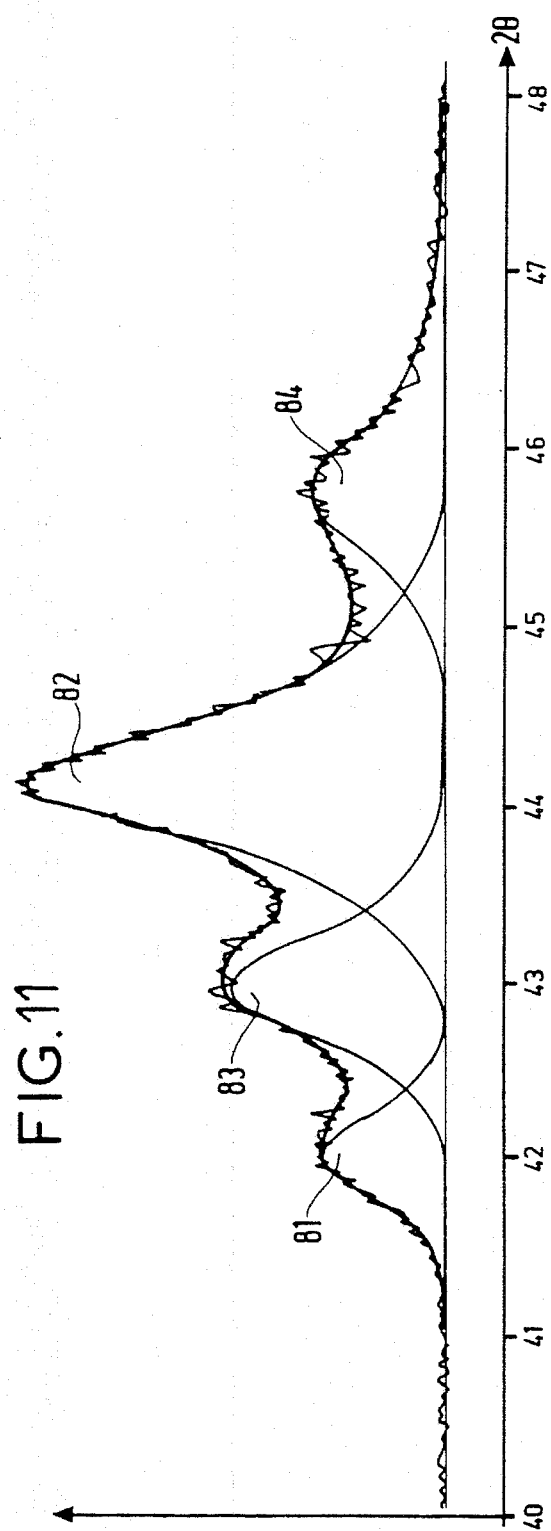
FIG. 11 shows a characteristic portion of the X ray diffraction diagram of the carbon-containing graphite-containing material contained in the anode of the invention in its initial state, the abscissa showing the angle of diffraction 2θ in degrees with a copper anticathode of wavelength λ=15.4 nm.
Figure 12:
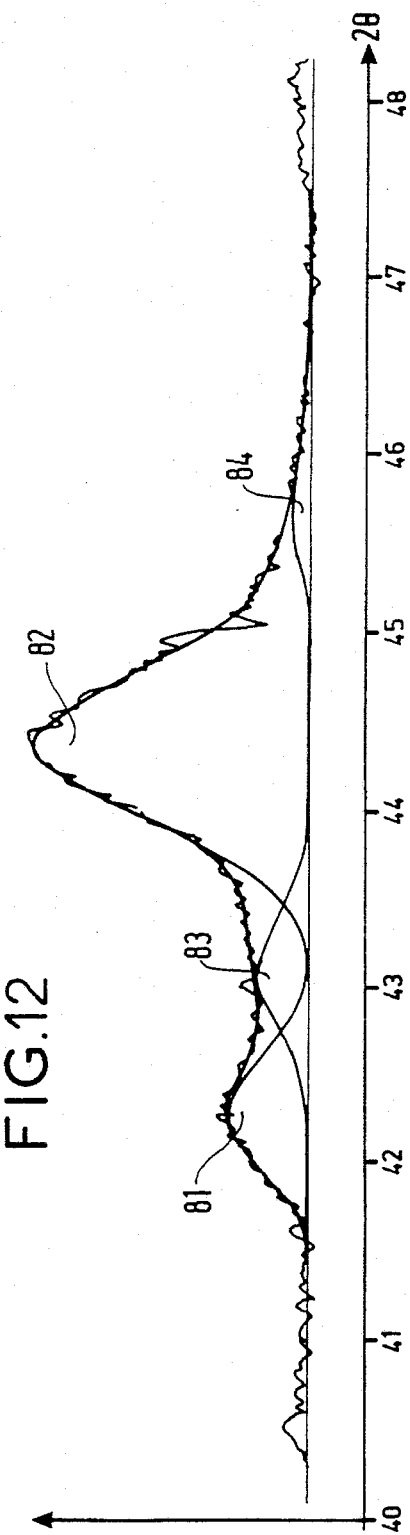

FIG. 12, analogous to FIG. 11, shows this portion of the diagram after cycling of the anode.

Figure 1:
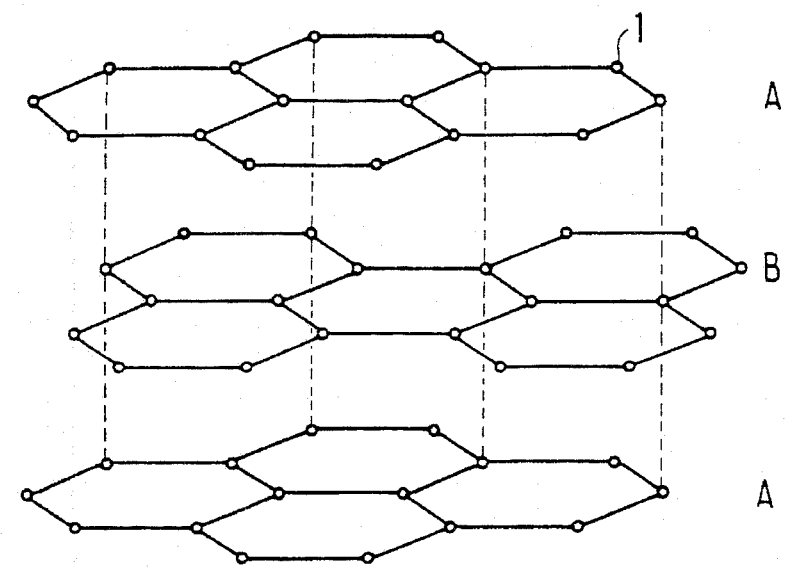
FIG. 1 is a diagram showing hexagonal crystal structure.
Figure 2:
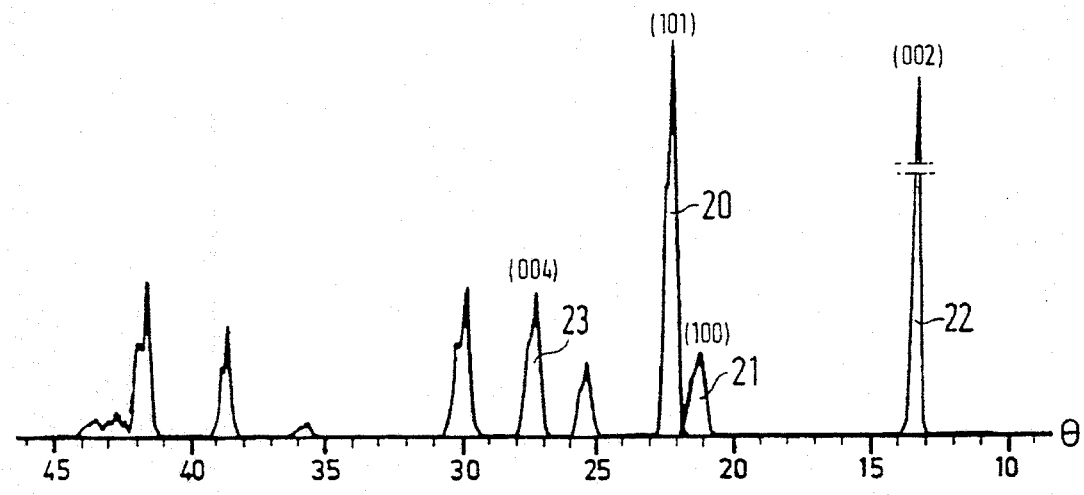
FIG. 2 is an X-ray diffraction diagram for a graphite having hexagonal crystal structure, the abscissa giving diffraction angle 2θ in degrees with a copper anticathode of wavelength λ=15.4 nm, and the ordinate representing the relative intensity of the lines.

Natural well ordered graphites have a structure which is mostly hexagonal as was initially demonstrated by Bernal (Proc. Roy. Doc. A., 106 (1924) 749). This structure as shown in FIG. 1 comprises alternating parallel planes A and B that are 0.335 nm to 0.337 nm apart and offset relative to each other and in which carbon atoms 1 occupy locations having hexagonal symmetry. The X-ray diffraction diagram of such a structure (FIG. 2) shows the [101] line 20 and the [100] line 21 characteristic of the hexagonal system.

Figure 3:
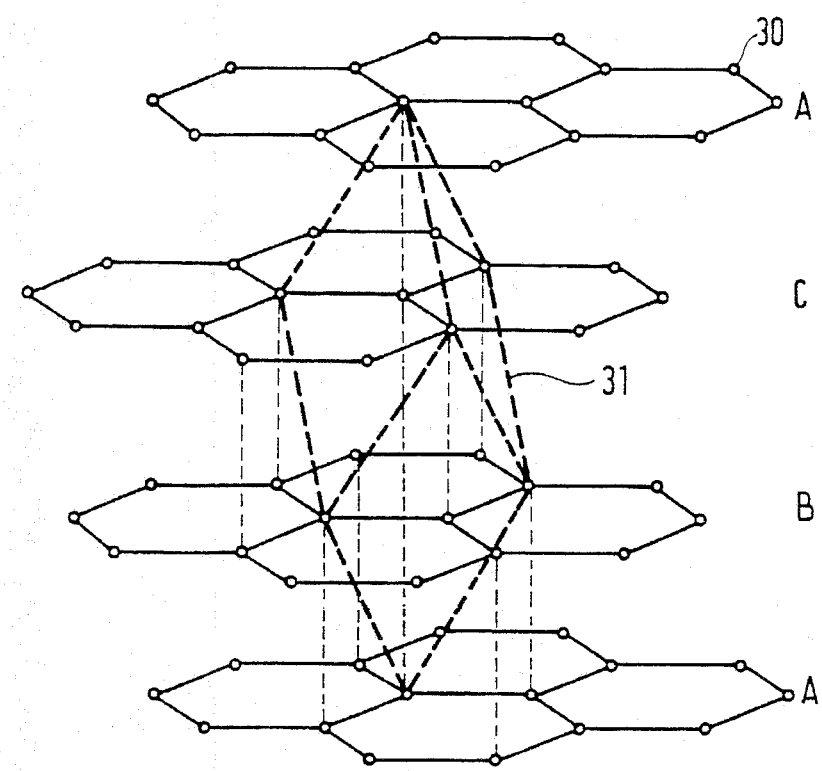
FIG. 3 is a diagram showing rhombohedral crystal structure.
Figure 4:
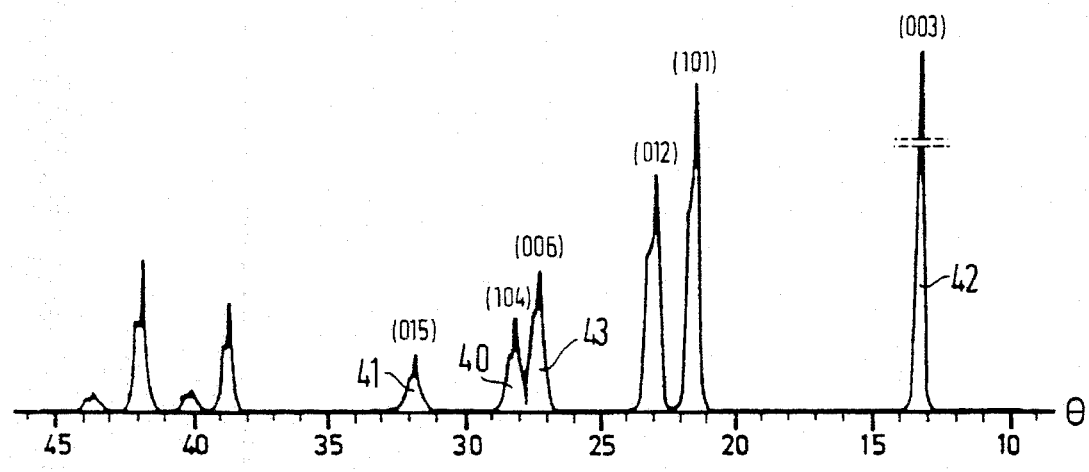
FIG. 4 is analogous to FIG. 2 and shows the X-ray diffraction pattern for the phase having rhombohedral crystal structure of graphite.

The presence, in some cases, of a second phase in graphite was recognized by Lipson and Stokes (Proc. Roy. Soc. A., 181 (1943) 101) and rhombohedral symmetry can be attributed thereto. In a rhombohedral structure, as shown in FIG. 3, the atoms 30 are likewise disposed with hexagonal symmetry in parallel planes. However, there are three positions A, B, and C for the planes of carbon hexagons. The planes are organized with periodicity ABCABCA . . . defining a rhombohedral lattice 31. The characteristic lines of this structure as observed in the X-ray diffraction diagram of FIG. 4 are the [104] line 40 and the [015] line 41.

Although the hexagonal structure constitutes the stable form, the rhombohedral structure is a metastable form that can be made to disappear, e.g. by heat treatment at a temperature of more than 1000° C. under certain conditions, in particular under vacuum, and at a temperature of more than 2000° C. at atmospheric pressure.

Figure 5:
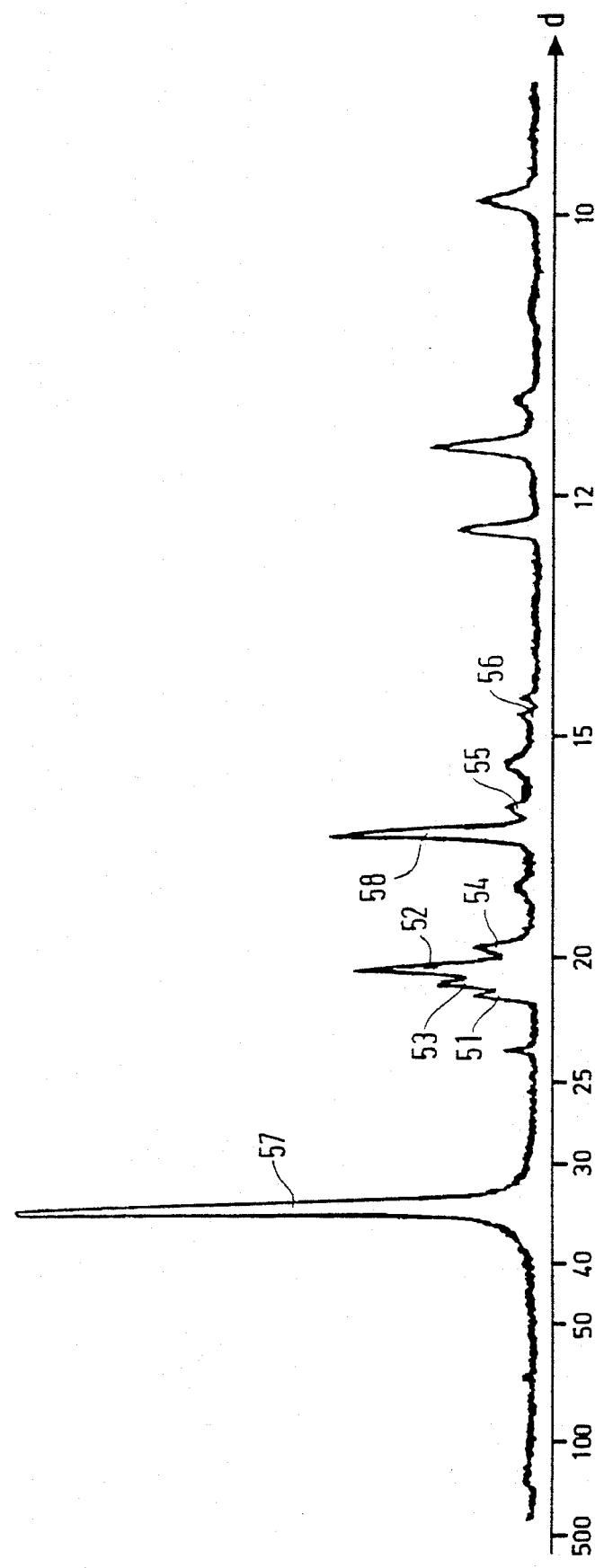
FIG. 5 is an X-ray diffraction diagram obtained for the carbon-containing graphite-containing material in the anode of the invention, prior to electrical cycling, with the abscissa being marked with the recticular distance d in nanometers and with the ordinate showing the relative line intensity.

FIG. 5 shows the X-ray diffraction diagram obtained when carbon contains both structures simultaneously. There can be seen the [100] line 51 and the [101] line 52 of the hexagonal system adjacent to the [101] line 53 and the [012] line 54 of the rhombohedral system, together with the smaller [104] and [105] lines 55 and 56 characteristic of the rhombohedral phase.

In addition, the [002] line 22 and the [004] line 23 of the hexagonal system (FIG. 2) coincide respectively with the [003] line 42 and the [006] line 43 of the rhombohedral system (FIG. 4) to give lines 57 and 58 (FIG. 5).

In a mixture of these two phases, the relative fraction of the rhombohedral phase is given by the ratio of the area of the [101] line 53 of the rhombohedral phase to the sum of the areas of the [101] line 52 of the hexagonal phase and the [101] line 53 of the rhombohedral phase, with the area of the [101] line 53 of the rhombohedral phase being weighted by a correction factor of 15/12. The uncertainty in the result is ±2% on the calculated value. For the material whose diagram is shown in FIG. 5, this ratio shows that it contains between 38% and 42% of rhombohedral phase (40±2%), the remainder being constituted by the hexagonal phase.

DETAILED DESCRIPTION OF THE INVENTION

EXAMPLE 1

Anodes in accordance with the present invention, comprising carbon-containing graphite-containing materials a to f (see Table I) containing a varying fraction greater than 10% of crystal rhombohedral phase were made. The remainder of the material was mainly constituted by a hexagonal phase. A mixture containing 90% of carbon-containing material, 5% of AB reference "YS" and 5% of PTFE was prepared.

The electrode was produced by spreading the mixture on a metal cloth or grid that was made of copper in the present example but that could equally well have been made of nickel. After drying, a circular anode having a diameter of 16 mm and a thickness of about 0.3 mm was cut out; it contained about 50 mg of carbon-containing material.

Figure 6:
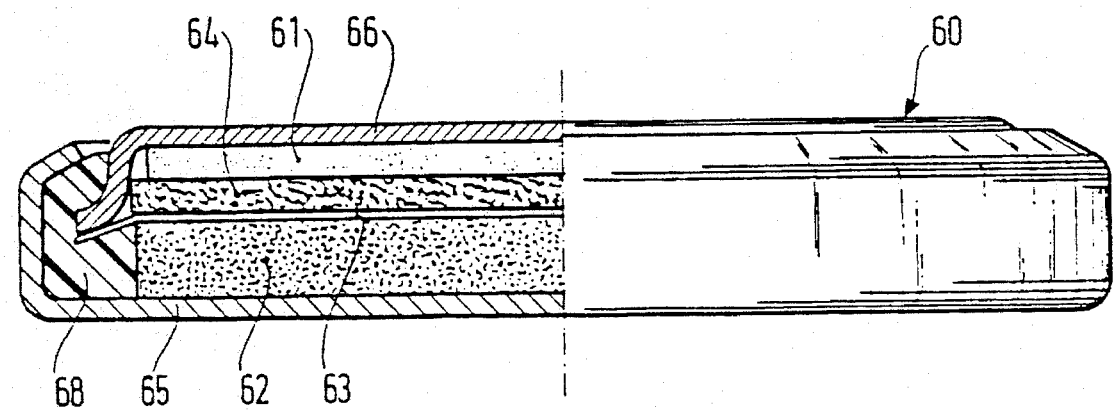
FIG. 6 is a section through a lithium rechargeable electrical cell containing the anode of the invention.

As shown in FIG. 6, a test cell was made up in the form of a button type electrochemical cell 60 containing the previously prepared anode 61 and a counter electrode 62 constituted by a lithium disk having a diameter of 22 mm and weighing about 110 mg. The two electrodes were separated by a microporous polypropylene (PP) separator 63 and by an electrolyte reservoir 64 constituted by PP fibers. The electrolyte used was composed of an organic solvent in the form of an equal volume mixture of ethylene carbonate and of dimethyl carbonate (EC/DMC), with lithium trifluoromethane-sulfonimide (LiTFSI) dissolved therein to a concentration of 1 mole/liter. The assembly was placed in a can 65 and closed in sealed manner by a cap 66 with an intervening gasket 68.

Initially, the electrochemically active area of carbon wetted by electrolyte was evaluated by measuring the capacitance of the double layer as expressed in millifarads per gram of carbon (mF/g) which varied with the specific area. This measurement was made using the known method of complex impedances and it was applied to the test cells whose anodes contained materials a to f. Results were obtained with an accuracy of ±5% on the calculated value; they are given in Table I.

Figure 7:
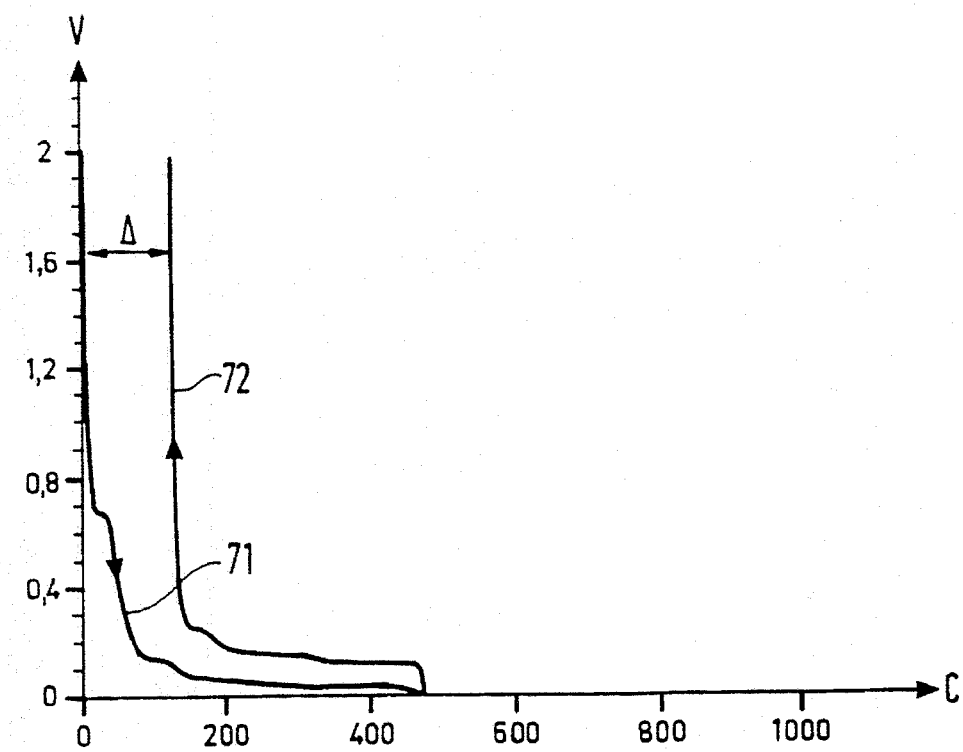
FIG. 7 shows an example of the curve obtained during the first intercalation and the first de-intercalation of lithium in the anode of the invention, the intercalation/de-intercalation capacity C of the carbon is plotted along the abscissa in milliampere hours per gram (mAh/g) and the voltage V of the cell is plotted along the ordinate in volts.

Thereafter, the cells whose first cycle is shown in FIG. 7 were subjected to electrochemical cycling. This was carried out initially by a first intercalation of lithium in the anode under conditions of 40 mA/g of carbon until a potential of 0 volts relative to lithium $Li/Li^+$ was reached (curve 71). Thereafter the lithium was de-intercalated (curve 72) under the same conditions until a potential of 2 volts was reached. The difference in capacity A between these two cycling steps corresponds to the loss of capacity due to passivation of the anode (passivation capacity). The results obtained appear in Table I below.

TABLE I

| Example | Rhombohedral phase (%) | Double layer capacitance (mF/g) | Passivation capacity Δ (mAh/g) |
|---------|------------------------|----------------------------------|--------------------------------|
| a | 21 | 500 | 50 |
| b | 19 | 600 | 60 |
| c | 23 | 800 | 90 |
| d | 40 | 1100 | 100 |
| e | 21 | 1500 | 110 |
| f | 14 | 1500 | 160 |
| g | 36 | 2100 | 150 |

For a rhombohedral phase content of the same order, the anodes of Examples a, b, c and e exhibited increasing passivation capacity with increasing area of carbon. The same observation can be made by comparing Examples d and g. This clearly shows the need to use materials with as low a specific area as possible to minimize the loss of capacity due to passivation of carbon.

It can be seen that for the same specific area (1500 mF/g), the anode comprising material e containing 21% of rhombohedral phase had a passivation capacity of 110 mAh/g, while the anode comprising material f which only contained 14% of this phase had a capacity loss of 160 mA/g. Consequently, for the same specific area, the fraction of rhombohedral phase in the material must be increased in order to reduce the capacity loss in the first cycles.

If the power of the cell is to be increased, i.e., the active surface of the anode is to be increased without increasing the passivation capacity, the fraction of rhombohedral phase must also be increased. This is shown by comparing the anodes comprising materials f and g, since the passivation capacity does not increase until the specific area has increased to 40% since the fraction of rhombohedral phase has more than doubled, from 14% to 36%.

COMPARATIVE EXAMPLE 2

As described for Example 1, anodes were produced from a plurality of carbon-containing graphite-containing materials, references h to j, containing little (less than 5%) or no rhombohedral phase. Electrochemical cells analogous to that of Example 1 and as shown in FIG. 6 were made up. Each cell included an anode as described above.

As described in Example 1, the double layer capacitance of the anode was measured as was the passivation capacity of the carbon material. The results are shown in Table II below.

TABLE II

| Material | Rhombohedral phase (%) | Double layer capacitance (mF/g) | Passivation capacity Δ (mAh/g) |
|---|---|---|---|
| h | <5 | 400 | 80 |
| i | <5 | 800 | 170 |
| j | <5 | 1200 | 190 |

Comparing with materials a, c and e in Table I, it can be seen that for equivalent specific areas, the loss of capacity caused by carbon passivation is greater for the anodes containing materials h(+60%), i (+89%) and j (+73%) respectively in Table II.

EXAMPLE 3

A carbon-containing graphite-containing material was made using the process of the invention as follows, using a commercial graphite k containing less than 5% of rhombohedral phase.

Graphite powder k was introduced into a receptacle containing 40 cm$^3$ of acetonitrile MeCN per gram of graphite. This receptacle was placed in a thermostated tank at 20° C. A sonotrode, connected to a 600W apparatus producing continuous ultrasound waves at a frequency of 20 kHz was immersed in the receptacle. The sonotrode vibrated at an amplitude of 120 μm and propagated the ultrasound waves in the liquid which took the graphite powder into suspension and created bubbles by cavitation. After about 10 minutes of treatment, the sonotrode was removed. The powdered material 1 obtained was separated from the liquid by filtering then vacuum drying at 110° C. for 2 hours. After treatment, the carbon-containing graphite-containing material 1 contained 13% of the rhombohedral phase.

Figure 8:
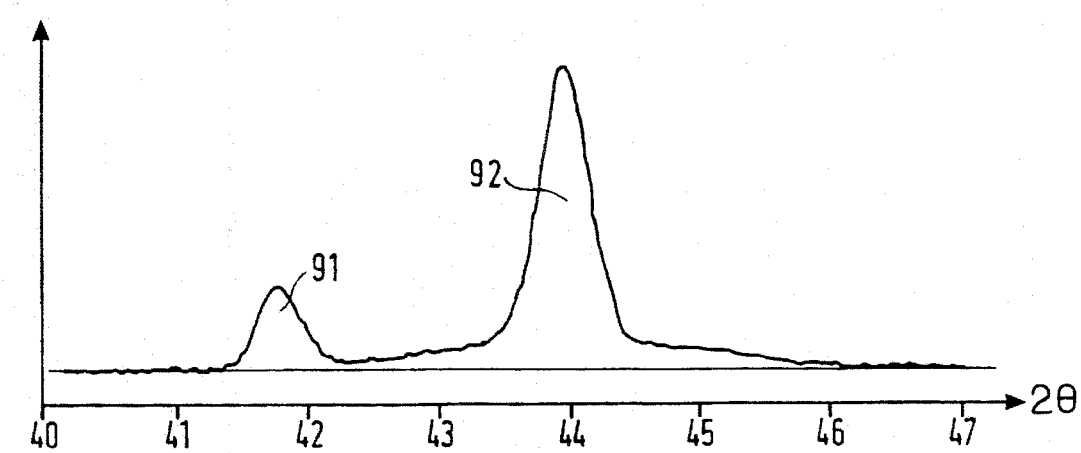
FIG. 8 shows a characteristic portion of the X ray diffraction diagram for a commercial graphite, with the abscissa giving the angle of diffraction 2θ in degrees with a copper anticathode of wavelength λ=15.4 nm.

The X ray diffraction diagram of commercial graphite k (FIG. 8) shows [100] and [101] lines 91 and 92 from the hexagonal phase in the spectral zone between 40 and 48 degrees.

Figure 9:
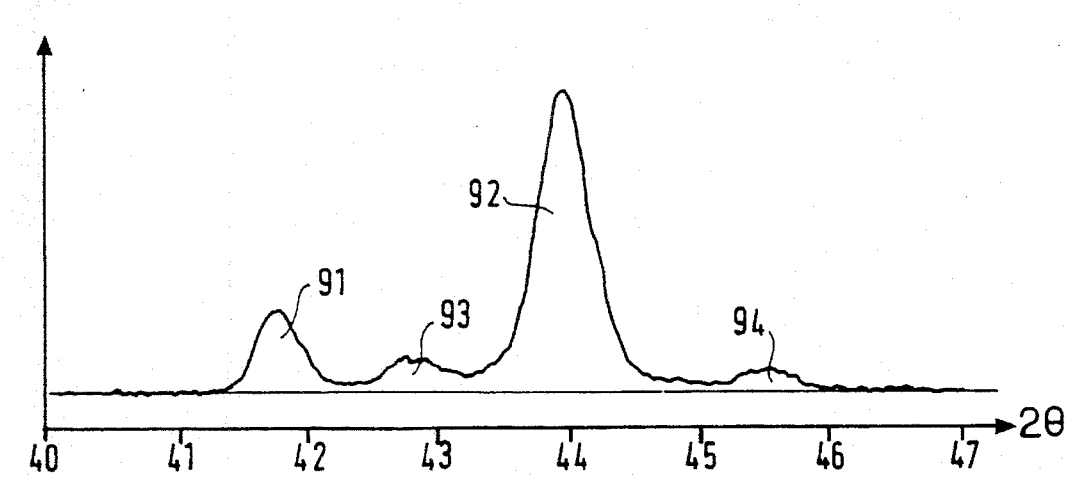
FIG. 9 is analogous to FIG. 8 and shows the same portion of the diagram for the carbon-containing graphite-containing material produced by the process of the invention.

The X ray diffraction diagram of material 1 (FIG. 9) shows [100] and [101] lines 91 and 92 from the hexagonal phase analogous to graphite and [101] and [012] lines 93 and 94 of the rhombohedral phase in the spectral zone between 40 and 48 degrees.

By way of comparison, the rhombohedral phase was enriched using a known process starting from a graphite h containing less than 5% of rhombohedral phase. Graphite h was ground in an impeller breaker for a minimum period of 15 minutes. A powdered carbon-containing material f was thus obtained which contained 14% of rhombohedral phase.

Anodes were produced from carbon-containing graphite-containing materials k, l, h and f as described for Example 1. Electrochemical cells analogous to those described in Example 1 and shown in FIG. 6 were made up. Each cell included one of the anodes produced above.

Figure 10:
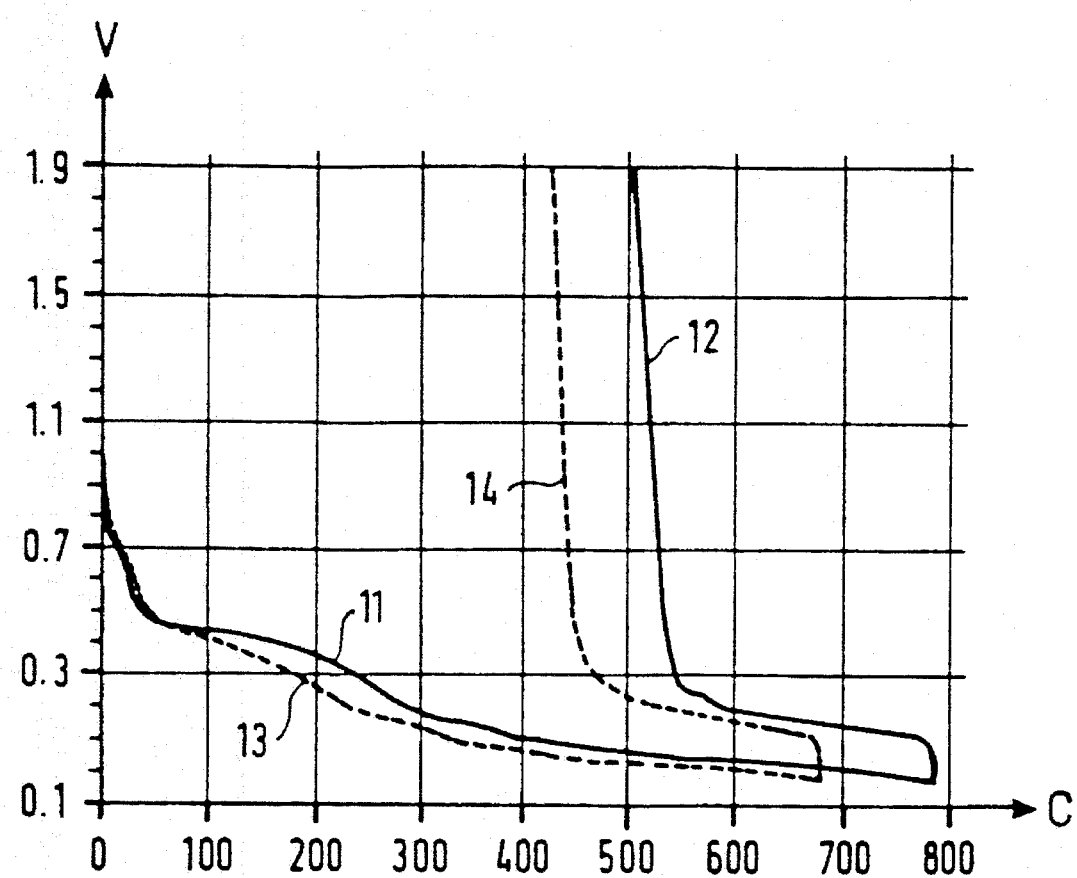
FIG. 10 shows a curve for the first charge and discharge of two anodes according to the present invention including a carbon-containing material prepared respectively by the process of the invention and a known process. The bulk capacity C of the material in mAh/g is shown along the abscissa and the voltage V in volts is shown along the ordinate.

The specific area of the material was first evaluated as described in Example 1 by measuring the capacitance of the double layer. This was followed by electrochemical cycling of the assembled cells. The first cycle is shown in FIG. 10 for materials k (curves 11–12) and l (curves 13–14). This was carried out initially by a first intercalation of lithium in the anode (curves 11 and 13) under conditions of 40 mA/g of carbon until a potential of 0 volts relative to lithium Li/Li$^+$ was reached. Thereafter the lithium was de-intercalated (curves 12 and 14) under the same conditions until a potential of 2 volts was reached. The difference in capacity Δ between these two cycling steps corresponds to the loss of capacity due to passivation of the anode (passivation capacity). The results obtained appear in Table III below.

TABLE III

| Material | Rhombohedral phase (%) | Double layer capacitance (mF/g) | Passivation capacity Δ (mAh/g) |
|---|---|---|---|
| k | <5 | 245 | 505 |
| l | 13 | 256 | 420 |
| h | <5 | 400 | 80 |
| f | 14 | 1500 | 160 |

It can be seen that producing carbon-containing material 1 using the process of the present invention retains an electrochemical specific area of the same order as that of the commercial graphite k, which is not the case for material f obtained from graphite h using the known process, where the specific area has been multiplied by a factor of about four. For specific areas of the same order, the loss of capacity is reduced by 17% when the anode material is produced by the process of the invention.

EXAMPLE 4

Using the same commercial graphite k, a carbon-containing material was produced using the process of the invention under analogous conditions to those described for Example 3 with the exception that the treatment period was 2 min, 5 min and 60 min respectively for materials m, n and p. The results obtained are shown in Table IV below.

TABLE IV

| Material | Treatment Period (minutes) | Rhombohedral phase (%) |
|---|---|---|
| m | 2 | 5 |
| n | 5 | 9 |
| l | 10 | 13 |
| p | 60 | 12 |

It can clearly be seen that under these conditions, a treatment period of 10 minutes is sufficient to obtain maximum enrichment.

EXAMPLE 5

Using the same commercial graphite k, a carbon-containing material was produced using the process of the invention under analogous conditions to those described for Example 3 with the exception of the treatment temperature. The tank was thermostatted at 1° C. and 48° C. respectively for the production of materials q and r. The results obtained are shown in Table V below.

TABLE V

| Material | Treatment Period (minutes) | Rhombohedral phase (%) |
| --- | --- | --- |
| q | 1 | 13 |
| l | 20 | 13 |
| r | 48 | 7 |

It can be seen that the treatment should preferably be carried out at lower temperatures, less than or equal to room temperature.

EXAMPLE 6

Using the same commercial graphite k, a carbon-containing material was produced using the process of the invention under analogous conditions to those described for Example 3 with the exception of the liquid medium used which in this case was water, an aqueous solution containing 20% by volume of ethanol $C_2H_5OH$, an aqueous solution containing 20% by volume of acetone $(CH_3)_2CO$, and an aqueous solution of potassium iodide KI, 0.5 mole/liter. The fractions of rhombohedral phase in the powders obtained were of the order of 12 to 13% for all the materials obtained.

EXAMPLE 7

Carbon-containing material d initially containing about 40% of the rhombohedral phase was heat treated at 2400° C. in argon for 15 minutes. This treatment substantially reduced the fraction of rhombohedral phase which was not more than 21% after treatment. Prolonging this treatment caused this phase to disappear completely.

EXAMPLE 8

Starting from carbon-containing material d which contained about 40% of rhombohedral phase, an electrode was made as follows. 85% by weight of material d was mixed with 15% of PVDF. The mixture was suspended in N-methyl-pyrrolidone (NMP), but it would also have been possible to use dimethylformamide (DMF), and it was spread on a metal collector constituted by copper foil having a thickness of about 10 microns.

After drying, an anode was cut out as described in Example 1, and a button type electrochemical cell was assembled analogous to that described in Example 1 and shown in FIG. 6, but including the anode as made above.

In the manner described in Example 1, the cell as made above was subjected to electrochemical cycling. The X-ray diffraction diagram of the carbon-containing material (FIG. 11) presents, in the spectral zone lying between 40° and 48° (diffraction angle 2θ and with a copper anticathode of wavelength λ=15.4 nm), the [100] line 81 and the [101] line 82 relating to the hexagonal phase and the [101] line 83 and the [012] line 84 of the rhombohedral phase.

After 10 cycles, the diagram (FIG. 12) shows, in the same zone, a very clear reduction in lines 83 and 84: the rhombohedral phase fraction had dropped to about 11%. It is clear that the rhombohedral phase does indeed act during the early cycles in the life of the cell and that gives rise to some of said phase disappearing.

EXAMPLE 9

Anodes were produced from a number of carbon-containing graphite-containing materials references s, t, and u (see Table VI) as described for Example 3. These anodes respectively contained less than 5% of rhombohedral phase, 23% and 37% of rhombohedral phase. Electrochemical cells analogous to those of Example 1 and shown in FIG. 6 were assembled. Each cell included the anodes and an electrolyte composed of an organic solvent which was a mixture of 20% by volume of EC, 20% by volume of PC and 60% by volume of DMC in which the lithium salt $LiPF_6$ was dissolved at a concentration of 1 mole/liter.

The capacitance of the double layer of the anode and the passivation capacity of the carbon-containing material was measured as described in Example 1. The results are shown in Table VI below.

TABLE VI

| Material | Rhombohedral phase (%) | Double layer capacitance (mF/g) | Passivation capacity (mAh/g) | Exfoliation |
| --- | --- | --- | --- | --- |
| s | <5 | 350 | none | yes |
| t | 23 | 400 | 370 | slight |
| u | 37 | 400 | 70 | no |

It can be seen that the graphite containing little or no rhombohedral phase (material s) was extremely sensitive to exfoliation. It could not thus be used in the electrolyte under consideration, and in general in any electrolyte containing PC.

On the other hand, materials in accordance with the present invention (materials t and u) functioned satisfactorily electrochemically, and the loss of capacity due to passivation and exfoliation was lower the higher the fraction of rhombohedral phase in the graphite.

Naturally the present invention is not limited to the embodiments described, but is capable of numerous variants available to the person skilled in the art without going beyond the spirit of the invention. In particular, any known process could be used which would produce a carbon-containing graphite-containing material containing a high fraction of rhombohedral crystal phase.

We claim:

1. A carbon anode for a lithium rechargeable electrochemical cell that also includes a cathode and an electrolyte, the anode comprising a graphite-containing carbon-containing material, wherein said material includes, prior to electrical cycling, at least a first rhombohedral phase constituted by graphite having a rhombohedral crystal structure, wherein the rhombohedral phase comprises a fraction of more than 10% of the graphite-containing carbon-containing material.

2. An anode according to claim 1, in which said material includes said first phase in a fraction of more than 14% of the graphite-containing carbon-containing material.

3. An anode according to claim 1, in which said material further includes a second phase constituted by graphite having a hexagonal crystal structure.

4. An anode according to claim 1, also containing a binder selected from the group consisting of fluorine-containing polymers and copolymers thereof, fluorine-containing elastomers, ethylene-propylene-diene terpolymers with a methylene main chain, carboxymethylcellulose, copolymers of styrene and butadiene, and mixtures thereof.

5. A process for the production of a carbon-containing graphite-containing material including at least one phase constituted by a rhombohedral crystal structure graphite and in a fraction of more than 10% of the carbon-containing graphite-containing material, said process comprising the following steps:

(a) introducing graphite into a liquid which is chemically inert to said graphite;

(b) generating ultrasound waves in said liquid by vibrating an element which is in contact with said liquid;

(c) separating said carbon-containing graphite-containing material from the liquid, then drying the carbon-containing graphite-containing material.

6. A process according to claim 5, wherein said liquid is selected from the group consisting of acetonitrile, water and an aqueous mixture containing a compound selected from the group consisting of an alcohol, a ketone and a salt.

7. A process according to claim 6, wherein in generating step (b) the ultrasound waves have an amplitude greater than 80 μm, the liquid has a temperature between the freezing point of said liquid and 20° C., and the ultrasound waves have a period of at least 10 minutes.

8. A lithium rechargeable electrochemical cell comprising an anode according to claim 1.

9. A lithium rechargeable electrochemical cell according to claim 8, comprising a cathode containing a transition metal oxide selected from the group consisting of vanadium oxide, lithium-containing manganese oxides, and oxides of nickel, cobalt, iron, titanium and mixtures thereof.

* * * * *